May 13, 1924.
G. J. CLARK
1,493,520
COMBINED RAKE AND FORK
Original Filed Sept. 12, 1921    2 Sheets-Sheet 1
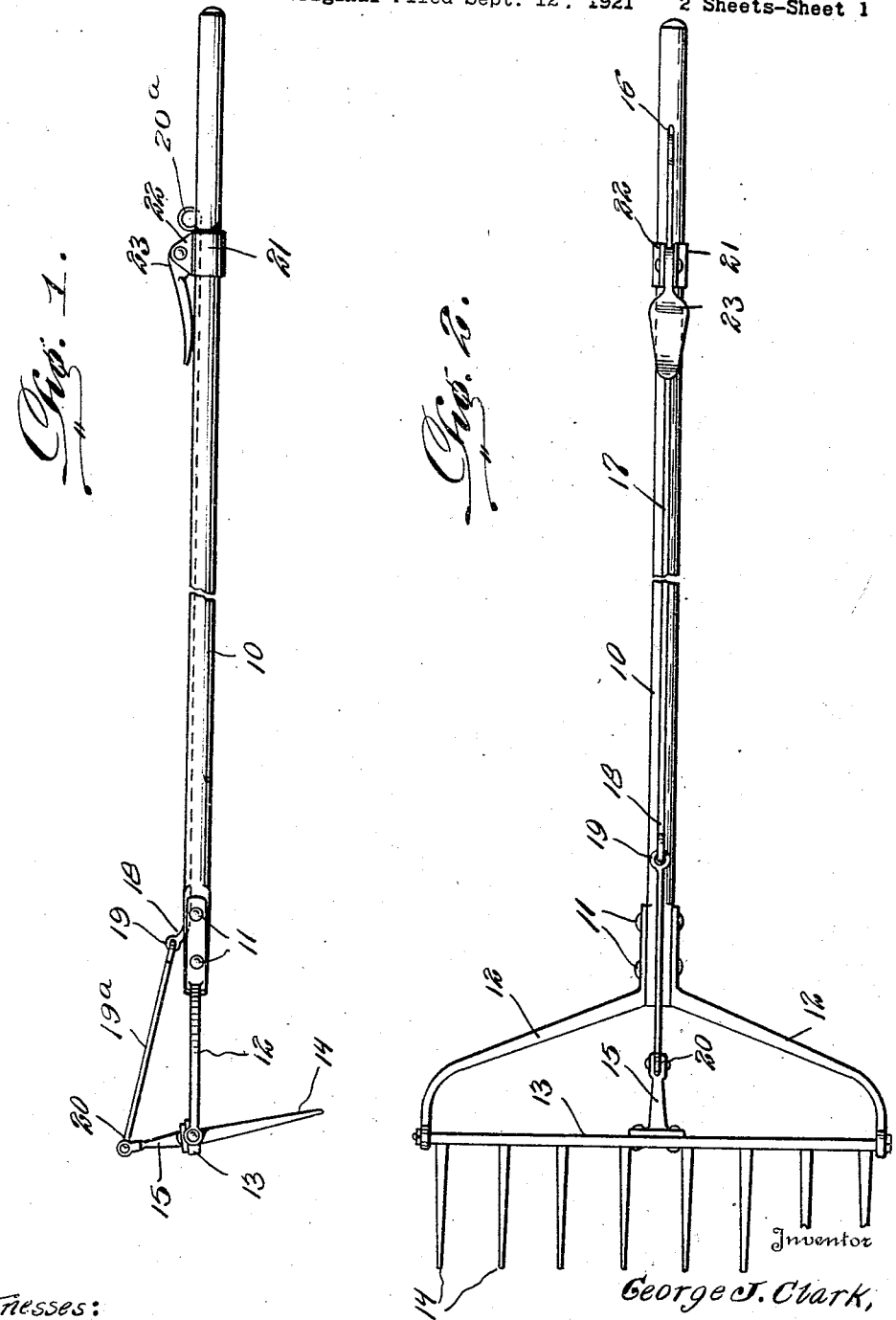
Witnesses:
F. L. Fox,
Inventor
George J. Clark,
By Victor J. Evans
Attorney May 13, 1924.
G. J. CLARK
1,493,520
COMBINED RAKE AND FORK
Original Filed Sept. 12, 1921    2 Sheets-Sheet 2
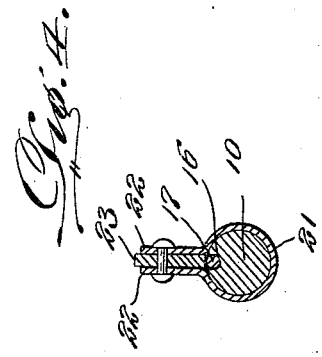
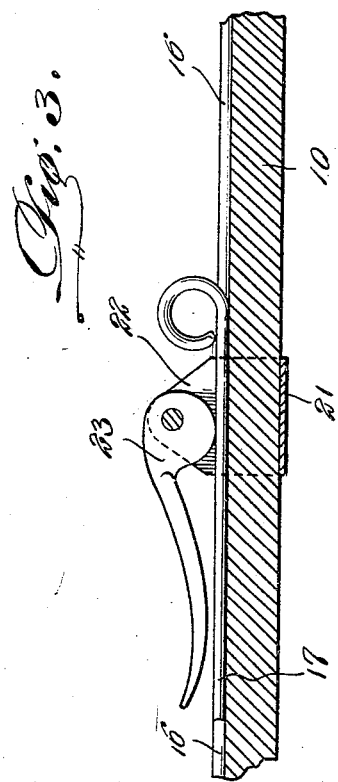
George J. Clark,
INVENTOR
BY Victor J. Evans.
ATTORNEY Patented May 13, 1924.

1,493,520

UNITED STATES PATENT OFFICE.

GEORGE JEFFERSON CLARK, OF DEFIANCE, OHIO.

COMBINED RAKE AND FORK.

Application filed September 12, 1921, Serial No. 499,975. Renewed March 19, 1924.

*To all whom it may concern:*

Be it known that I, GEORGE J. CLARK, a citizen of the United States, residing at Defiance, in the county of Defiance and State of Ohio, have invented new and useful Improvements in Combined Rakes and Forks, of which the following is a specification.

This invention relates to garden implements, particularly to rakes, and has for its object the provision of a rake which has a rotatably mounted head whereby it may be used either as a rake or a fork, thus combining the advantages of the two tools, means being provided whereby the device may be converted from one implement to the other without necessitating stooping down or other inconveniences.

An important object is the provision of a device of this character in which the arrangement is such that the rake head may be adjusted so as to bring the teeth at any desired angle with respect to the handle, depending upon the character of the work to be done or dependent upon any other conditions which might arise.

Another object is the provision of a rake of this character which is of the so-called self-cleaning type owing to the movability of the rake head proper.

An additional object is the provision of a rake of this character which will be simple and inexpensive in manufacture, easy to operate, efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of my rake in normal position,

Figure 2 is a plan view of the device, showing it converted into a fork,

Figure 3 is an enlarged longitudinal sectional view through the operating rod locking means, Figure 4 is a cross sectional view through the locking means, Figure 5 is a front view of the head alone.

Referring more particularly to the drawings, I have shown my device as comprising an elongated handle 10 of suitable material and of any desired length and diameter. Secured upon one end of this handle, as by means of transverse bolts or rivets 11, are divergent arms 12 between the free ends of which is pivoted a rake head including a back bar 13 from which extend teeth 14. This back bar of the rake head is provided at its center with an upstanding finger 15.

Slidable longitudinally within a groove 16 in the handle is an operating rod 17 which has one end formed with a finger engaging loop $20^a$ and which has its other end offset at an angle, as shown at 18 and terminating in an eye 19 with which is pivotally connected a link $19^a$ which is, in turn, pivotally connected, as shown at 20, with the free end of the finger 15.

Secured upon the handle at a point remote from the rake head is a metal band 21 which has its ends formed with spaced ears 22 between which is pivoted a cam locking lever 23 which is engageable with the rod 17 for the purpose of locking the latter at any desired adjustment.

The use of the device is as follows:

When the device is to be used as an ordinary garden rake, for raking up leaves, cut grass, and the like, the parts are so adjusted that the teeth 14 of the rake head will extend at right angles to the handle in exactly the same manner as any ordinary rake, the locking lever 23 holding the rod 17 with the eye or loop 20 thereof disposed immediately adjacent the band 21. During the use of the device as a rake, it is apparent that the operator may loosen the lever 23 and alternately pull or push the rod 17 so as to swing the rake head so that the teeth thereof will shake off any litter accumulated thereon. When the device is to be used as a fork for lifting or pitching heaps of grass, leaves, and the like, it is merely necessary to loosen the lever 23 and pull upon the rod 17 whereupon the pivoted back bar 13 of the rake head will be swung into such position that the teeth 14 will extend parallel with the handle 10. The device thus constitutes a fork and rigidity is attained by locking the lever 23 upon the rod 17.

From the foregoing description and a study of the drawings it will be apparent that I have thus provided a simply constructed and consequently inexpensive rake which may be used in the ordinary manner and which is convertible for use as a fork so that the device will have the advantages of both these implements while being less expensive to manufacture.

While I have shown and described the preferred embodiment of my invention, it is of course to be understood that I reserve the right to make such changes in the form, construction and arrangement of parts as will not depart from the spirit of the invention or the scope of the subjoined claim.

What is claimed is:—

An implement of the character described comprising an elongated handle formed with a guide groove, divergent arms carried by one end of the handle, a head pivoted between said arms and carrying a central upstanding finger, a rod slidable longitudinally within said groove and having one end formed with a ring constituting a finger piece, a link pivotally connected with the other end of said rod and with said finger, a band encircling the handle, and a swingable lock pivoted between ears on said band and having a cam head, locked in one position, engaging said rod for holding the same in adjusted position, said ring being engageable against said band for limiting movement of the rod in the direction in which the cam is not locked.

In testimony whereof I affix my signature.

GEORGE JEFFERSON CLARK.

Witnessed by—
   CHAS. BAUER.
   WILLIAM B. KEMPER.